S. G. WISE.
Thill-Couplings.

No. 142,830.  Patented September 16, 1873.

Witnesses.  Inventor.

UNITED STATES PATENT OFFICE.

SAMUEL G. WISE, OF EDGERTON, OHIO.

IMPROVEMENT IN THILL-COUPLINGS.

Specification forming part of Letters Patent No. 142,830, dated September 16, 1873; application filed March 24, 1873.

*To all whom it may concern:*

Figure 1:
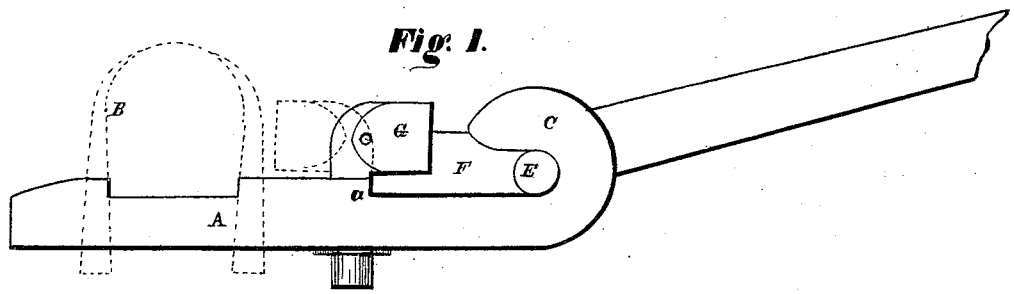
Figure 2:
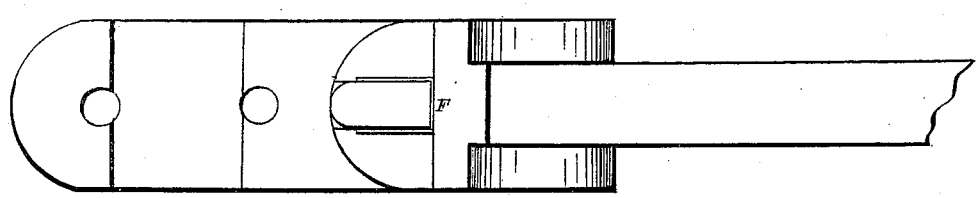
Figure 3:
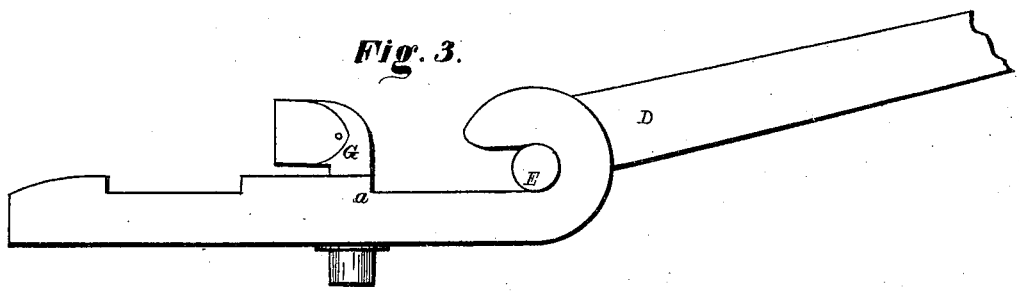
Figure 4:
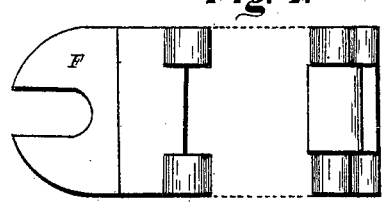
Figure 5:
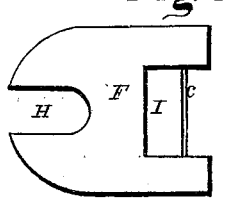

Be it known that I, SAMUEL G. WISE, of Edgerton, in the county of Williams and State of Ohio, have invented certain new and useful Improvements on Thill-Couplings, of which the following is a full, clear, and complete description:

Figure 1 is a side view of the coupling. Fig. 2 is a top view. Fig. 3 is also a side view, having certain parts detached therefrom. Figs. 4 and 5 are detached sections.

Like letters of reference refer to like parts in the several views.

This invention has for its object the attachment of thills to the axle-tree of a carriage without the use of a bolt and nut; and, furthermore, to prevent the connection from becoming loose and rattling.

The nature of the coupling and its manner of operation are as follows:

In the drawings, A represents the bar of the clip, and B the band whereby it is secured to the axle. The front end of the bar is made to project forward, and terminates in a bifurcated hook, C, between the cheeks of which the end of the thill D is fitted, and which is retained therein by the lugs E, as shown in the drawings. The end of the thill is prevented from being forced back from its engagement with the hooks, and thereby becomes detached, by a plate, F, interposed between the end of the thill and a swivel bolt or pin, G. A detached view of said plate is shown in Fig. 4, of which Fig. 5 is an under-side view. Said plate is prevented from being pushed back by a shoulder, *a*, of the clip-bar A, and which is also prevented from being displaced laterally and upwardly by the pin G, which, as will be seen, passes through the slot H of the plate, while the head thereof projects over onto the plate, as shown in Fig. 1. Between the end of the thill and the end of the plate is interposed a rubber block, I, Fig. 5, the side of which next the end of the thill is protected from abrasion by a metal plate, *c*. The position of the coupling when the thill is attached thereto is such as is shown in Fig. 1.

In order to uncouple the thill the pin G is turned about as shown in Fig. 3. The plate can then be readily removed from its place, leaving the throats of the hooks open, as shown in said figure, so that the lugs E of the thill can be slipped back and out therefrom.

The purpose of the rubber block is to keep the lugs at all times pressed into the hook, and thereby prevent rattling.

What I claim as my invention, and desire to secure by Letters Patent, is—

In thill-couplings, the clip-bar A, having bifurcated turned ends C, and shouldered at *a*, plate F, having the slot H, rubber block I, swivel-pin G, and thill D, combined and arranged to operate substantially as and for the purpose set forth.

SAMUEL G. WISE.

Witnesses:
S. BEMENT,
ISAAC SPRINGER.